United States Patent

[11] 3,597,522

[72] Inventor Masashi Kobayashi
 Kawasaki, Japan
[21] Appl. No. 868,400
[22] Filed Oct. 22, 1969
[45] Patented Aug. 3, 1971
[73] Assignee Asahi Denki Kabushiki Kaisha
 Kawasaki, Japan

[54] VIBRATION DAMPER FOR CONDUCTORS
 6 Claims, 5 Drawing Figs.
[52] U.S. Cl. .................................................. 174/42, 188/1
[51] Int. Cl. ...................................................... H02g 7/14
[50] Field of Search ........................................... 174/42; 188/1 B, 102, 103

[56] References Cited
UNITED STATES PATENTS
2,215,541 9/1940 Buchanan et al. ............ 174/42
2,271,935 2/1942 Buchanan et al. ............ 174/42

Primary Examiner—Laramie E. Askin
Attorney—Wenderoth, Lind & Ponack

ABSTRACT: In a damper comprising a conductor-grasping element and a weight, said element providing a box-shaped housing so that a portion of said weight can be introduced into it, whereby elastic or resilient bodies having suitable shapes are disposed between the spaces defined by the inner surface of said box-shaped housing and outer periphery of that portion of said weight within said housing so that said weight is held resiliently by said housing through said elastic or resilient bodies.

PATENTED AUG 3 1971

MASASHI KOBAYASHI,
INVENTOR

BY Wenderoth, Lind & Ponack
ATTORNEYS

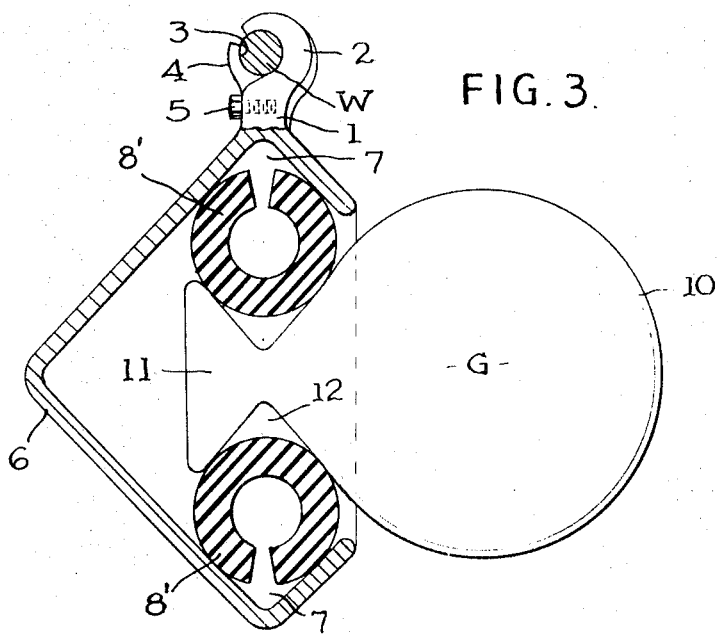
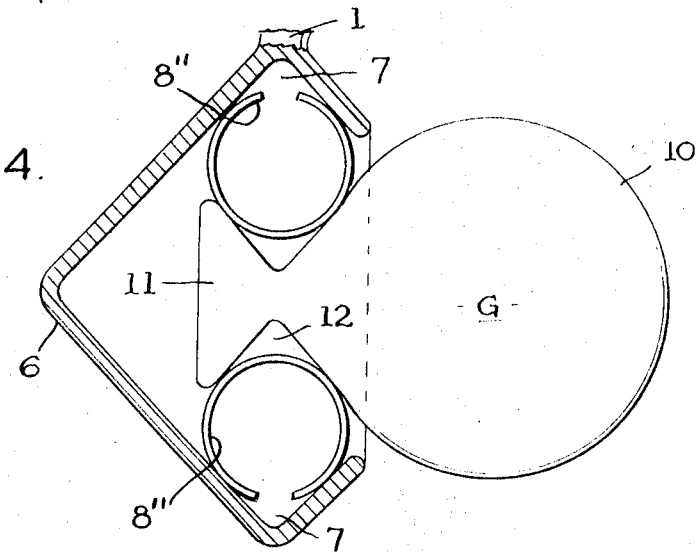

VIBRATION DAMPER FOR CONDUCTORS

BACKGROUND OF THE INVENTION

The present invention relates to a vibration damper for use with conductors for supplying and distributing electricity which damps oscillations of the conductors when mounted on them.

In order to prevent conductors from oscillating, a device in which a weight is mounted to each conductor through an arm has been hitherto publicly known and various constructions have been proposed. Another proposal is to mount a weight to each conductor through the use of elastic bodies to absorb the oscillation energy by their internal friction so that prevention of the oscillation is effected.

SUMMARY OF THE INVENTION

It is an object of the present invention to provide a vibration damper for use with conductors which performs a dual effect by the oscillation absorptive action of an elastic body like rubber and by the so-called torsional damper absorptive action of oscillations through interstrand friction caused by torsion in conductors.

A further object of the present invention is to provide a vibration damper for use with conductors which can suitably select the frequency ranges of the oscillation caused in a conductor to be damped.

Another object of the present invention is to provide a vibration damper for use with conductors which occupies a smaller dimension in the direction of the conductor as compared with conventional dampers so that, in case of mounting a number of dampers to a conductor, their mounting positions can be selected as desired.

The damper for use with conductors according to the present invention is preferably composed of a conductor grasping element providing a box-shaped element and a weight having an elongation which is shaped so as to form two or more elastic body embracing spaces between it and the inside of said box-shaped element when they are assembled, whereby said spaces have interposed therein elastic bodies each having suitable shape so that said weight is supported by said box-shaped element by means of said elastic bodies, with the center of gravity of said weight being out of the perpendicular line passing through the centerline of the conductor so that, upon a relative movement of said box-shaped element, said weight causes said elastic bodies to elastically deform.

BRIEF DESCRIPTION OF THE DRAWINGS

These and other objects of the present invention will become more apparent to those skilled in the art when considered in conjunction with the following detailed description and the illustrative accompanying drawings wherein:

FIGS. 3, 4 and 5 represent further modified embodiments.

DESCRIPTION OF A PREFERRED EMBODIMENT

Figure 1:
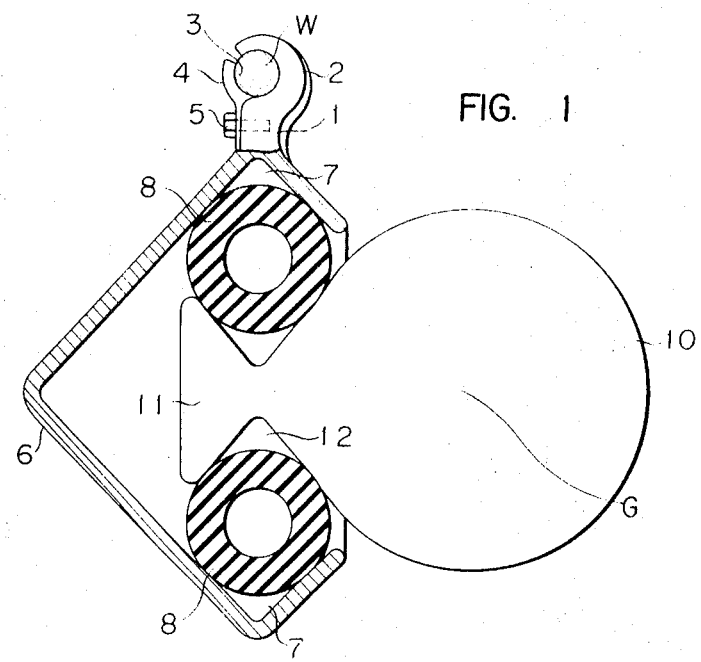
FIG. 1 is a partial sectional view of an embodiment of a damper for use with conductors according to the present invention viewed in the direction of the conductor.
Figure 2:
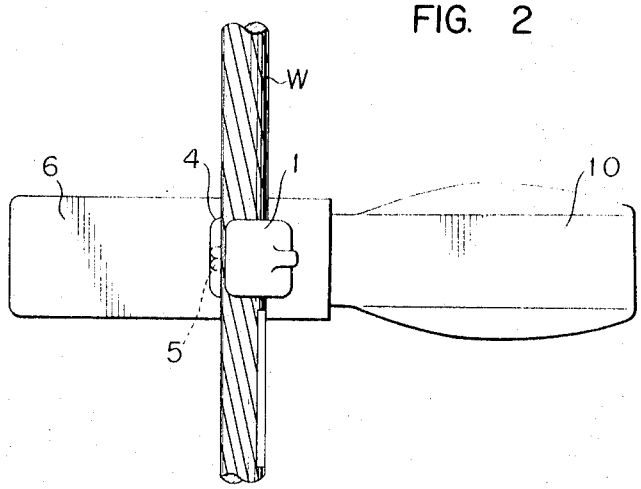
FIG. 2 is a plan view of the damper shown in FIG. 1.

Referring now to FIGS. 1 and 2 of the drawings, there is shown an embodiment of a damper for use with conductors in accordance with the present invention, in which 1 designates a conductor-grasping element, usually called a clamp, being designed so as to have any desired shape and, in the embodiment shown, it is composed of a conductor receiving element 2 having an inner semicylindrical surface and a holding piece 4 similarly having an inner semicylindrical surface 3, thereby a conductor W whose oscillation is to be damped is held between the conductor receiving element 2 and the holding piece 4 by rigidly fixing the latter to the former such as with a bolt 5, which is screwed into the conductor-receiving element 2 through a hole provided in the holding piece 4.

The conductor-grasping element 2 is integrally formed with a box-shaped housing 6 so that it is directly disposed below the conductor W when it is mounted on the conductor W. The box-shaped housing 6 also may be constructed so as to have any desired shape, but it must have such a shape that the inner space defined by its configuration cooperates with the outer configuration of the to-be-suspended portion 11 of a weight 10 disposed within it so that there are formed a number of spaces to receive elastic bodies to be explained in greater detail.

In the embodiment shown, the housing is shaped as if a square is cut by a plane parallel with one of its diagonals near the apexes lying on the diagonal. The weight 10 has generally a disclike shaped body with a portion thereof being elongated along a line of its symmetry and the elongated portion is cut out at its upper and lower portions 12 by isosceles right-angled triangles respectively so that there is left a symmetrical dovetail portion 11 in the elongated portion. When the dovetail portion 11 of the weight 10 is introduced into the inner space of the box-shaped housing 6 so that the apexes of the isosceles right-angled triangles forming the dovetail portion 11 of the weight 10 respectively confront or align with the apexes lying on a perpendicular diagonal of the box-shaped housing 6 respectively, there are formed two substantial square spaces 7, 7 between the inside of the box-shaped housing 6 and the outer periphery of the dovetail portion 11 of the weight 10. Accordingly, when a tubular or an annular elastic body 8 is introduced into respective square spaces 7, 7 so that its periphery comes into contact with the inner side surface of the box-shaped housing 6 and the outer surface of the dovetail portion 11 of the weight 10, the weight 10 is supported by the box-shaped housing 6 via the elastic bodies 8, 8 from the conductor W. In FIG. 1, reference numeral 12 designates the space between the lateral dovetail portion 11 of the weight 10 and the outer peripheries of the elastic bodies 8, 8.

Though the present invention has been described in accordance with a specified embodiment shown, the box-shaped housing 6 and the conductor receiving portion 2 of the conductor-grasping element 1 may be made separately and assembled together by welding or bolt and nut. The elastic body 8 is preferably made of a material such as vibration insulating rubber, either of the aforesaid generally circular form, or of a C-shaped form as shown at 8' in FIG. 3, but also as per FIG. 4 a metallic leaf spring shaped or coiled so as to have a C-shaped configuration, designated 8, may be also used. Further, depending on the shape of the space formed between the boxlike housing and the dovetail portion, a coil spring 8''', as shown in the FIG. 5 embodiment may be used. Of course, the shape of such space is not limited to a square, on the contrary, linear polygons or polygons having partially curved lines can also be used. The shape of the elastic body 8 can be made to have any desired configuration depending on the shape of the space, thus an elastic body having circular, elliptical or oval cross section rather than an annular cross section as shown in FIG. 1 may be also used even though it is made of rubber. It will be understandable to those skilled in the art that the space is not to be limited to a square shape, nor the number of the spaces limited to only a pair, and that the symmetrical arrangement of such spaces is not necessarily required. The weight 10 may be also designed to have any desired shape. However, the weight 10 needs to be disposed in such a manner that the position of its center of gravity G is remote from its suspended end portion 11 and simultaneously does not lie directly below the conductor W.

The vibration damper according to the present invention has one preferred construction as above-mentioned. Next its operation will be explained.

When the conductor W is going to oscillate, the weight 10 accordingly oscillates relative to the conductor grasping element 1 so that the shapes of the spaces 7,7 deform, which then deforms the elastic bodies 8,8. Accordingly, the elastic bodies absorb the energy by means of internal friction or the like so as to quickly damp the oscillation. Further, since the position of the center of gravity of the weight 10 is remote from the perpendicular plane passing through the axis of the conductor W, there arises twisting or torsional force in the conductor W due to the oscillation, which results in the generation of friction or the like between the elementary wires of the conductor to prevent it from being oscillated.

I claim:

1. A vibration damper for use with electrical conductors comprising a conductor grasping element providing a box-shaped housing, a weight having a portion introduced into said housing so that between the inner surface of said housing and the outer periphery of said portion there are formed suitable shaped spaces and resilient body means disposed in said spaces with each body means having an outer periphery in contact with the inner surface of said housing and the outer periphery of said portion of said weight, whereby the center of gravity of said weight is positioned out of a perpendicular line including the conductor.

2. A vibration damper as defined in claim 1 wherein said box-shaped housing has a generally square shape and said weight has substantially a circular shape with a portion thereof being elongated so as to have a symmetrical shape with respect to the centerline of said weight, whereby said elongated portion is cut out at its upper and lower portions so as to have a symmetrical dovetail shape, so that each of said spaces has substantially a rectangular shape.

3. A vibration damper as defined in claim 2 wherein said resilient body means include bodies having generally annular ring shapes made of elastic material.

4. A vibration damper as defined in claim 1 wherein said resilient body means include bodies of arcuate C-shape.

5. A vibration damper as defined in claim 4 wherein said arcuate C-shape bodies are formed of leaf spring means.

6. A vibration damper as defined in claim 1 wherein said resilient body means include coiled leaf spring means.